US009225499B2

(12) United States Patent
Shulman et al.

(10) Patent No.: US 9,225,499 B2
(45) Date of Patent: Dec. 29, 2015

(54) METHOD, APPARATUS AND SYSTEM OF TRANSFERRING DATA BETWEEN ELEMENTS OF A CABLE COMMUNICATION DEVICE (75) Inventors: Shaul Shulman, Ramat Gan, IL (US); Dmitrii A. Loukianov, Chandler, AZ (US); Naor Goldman, Moshav Ein-Vered, IL (US); Bernard Arambepola, Enfield (GB)

(73) Assignee: INTEL CORPORATION, Santa Clara, CA (US)

(*) Notice: Subject to any disclaimer, the term of this patent is extended or adjusted under 35 U.S.C. 154(b) by 216 days.

(21) Appl. No.: 13/976,468

(22) PCT Filed: Mar. 28, 2012

(86) PCT No.: PCT/US2012/031038
§ 371 (c)(1),
(2), (4) Date: Jun. 27, 2013

(87) PCT Pub. No.: WO2013/122613
PCT Pub. Date: Aug. 22, 2013

(65) Prior Publication Data
US 2013/0272357 A1 Oct. 17, 2013

Related U.S. Application Data (60) Provisional application No. 61/597,882, filed on Feb. 13, 2012.

(51) Int. Cl.
*H04L 5/14* (2006.01)
*H04L 1/00* (2006.01)
(52) U.S. Cl.
CPC ............... *H04L 5/14* (2013.01); *H04L 1/0041* (2013.01); *H04L 1/0083* (2013.01)

(58) Field of Classification Search
CPC ............ H04L 29/06027; H04L 1/0041; H04L 1/0083; H04L 5/14
See application file for complete search history.

(56) References Cited

U.S. PATENT DOCUMENTS 5,758,073 A 5/1998 Liang et al.
2005/0213693 A1* 9/2005 Page .............................. 375/354
(Continued)

FOREIGN PATENT DOCUMENTS

JP 2004-173133 6/2004
JP 2005-086277 3/2005
(Continued)

OTHER PUBLICATIONS

International Preliminary Report on Patentability and Written Opinion for PCT Patent Application No. PCT/US2012/031038, mailed on Aug. 28, 2014, 7 pages.
International Search Report and Written Opinion for PCT/US2012/031038, mailed on Jan. 2, 2013; 10 pages.
(Continued)

*Primary Examiner* — Curtis Odom
(74) *Attorney, Agent, or Firm* — Shichrur & Co.

(57) ABSTRACT

Some demonstrative embodiments include devices, systems and methods of transferring information between elements of a communication device. For example, a device may include a front-end to receive an analog downstream input including a plurality of downstream data channels, and to provide a digital serial downstream output including at least one continuous stream of constant-size downstream frames including a plurality of constant-size downstream data frames, which include downstream sample data of the plurality of downstream data channels; a serial interface including at least one serial lane to transfer the at least on stream of the digital serial downstream output; and a processor to receive the digital serial downstream over the serial interface, and to process the downstream data frames.

29 Claims, 4 Drawing Sheets

(56) References Cited

U.S. PATENT DOCUMENTS

| | | |
|---|---|---|
| 2006/0007959 A1 | 1/2006 | Merriam, Jr. |
| 2007/0294738 A1 | 12/2007 | Kuo et al. |
| 2008/0298519 A1 | 12/2008 | Tsutsui et al. |
| 2010/0027719 A1 | 2/2010 | Pahuja |
| 2010/0195550 A1 | 8/2010 | Nakano et al. |

FOREIGN PATENT DOCUMENTS

| | | |
|---|---|---|
| JP | 2008-263338 | 10/2008 |
| JP | 2008-294825 | 12/2008 |
| WO | 2007/058341 | 5/2007 |
| WO | 2008126749 | 10/2008 |

OTHER PUBLICATIONS

A.X. Widmer, P.A. Franaszek; IBM Journal of Research and Development; vol. 27, No. 5, Sep. 1983; "A DC-Balanced, Partitioned-Block, 8B/10B Transmission Code"; 14 pages.

DOCSIS 3.0 Data Over Cable Service Interface Specifications; Physical Layer Specification; CM-SP-PHYv3.0-I10-111117; Nov. 17, 2011; 171 pages.

PCI Express Base Specification Revision 3.0; Nov. 10, 2010; 860 pages.

Serial ATA International Organization: Serial ATA Revision 3.0; Jun. 2, 2009; Gold Revision; 663 pages.

Office Action for Japanese Patent Application No. 2014-557618, mailed on Sep. 8, 2015, 5 pages (including 2 pages of English translation).

\* cited by examiner

METHOD, APPARATUS AND SYSTEM OF TRANSFERRING DATA BETWEEN ELEMENTS OF A CABLE COMMUNICATION DEVICE

CROSS REFERENCE

This application is a National Phase Application of PCT International Application No. PCT/US2012/031038, International Filing Date Mar. 28, 2012, which in turn claims the benefit of and priority from U.S. Provisional Patent application No. 61/597,882, filed Feb. 13, 2012, the entire disclosures of which are incorporated herein by reference.

BACKGROUND

A cable network may include a cable modulator-demodulator (modem) capable of transferring downstream data from a Cable-Modem-Termination-System (CMTS) to one or more devices (subscriber devices), and transferring upstream data from the devices to the CMTS.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of the invention. However it will be understood by those of ordinary skill in the art that the present invention may be practiced without these specific details. In other instances, wen-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one.

The term plurality, as used herein, is defined as two, or more than two. The term another, as used herein, is defined as, at least a second or more.

The terms including and/or having, as used herein, are defined as, but not limited to, comprising.

The term coupled as used herein, is defined as operably connected in any desired form for example, mechanically, electronically, digitally, directly, by software, by hardware and the like.

Some embodiments may be used in conjunction with various devices and systems, for example, a communication system, a communication device, a modem, a gateway, a cable network, a cable modem, a cable gateway, a Personal Computer (PC), a server, a networking device, whether wired or wireless, and the like. It will be understood by those skilled in the art that this is a very brief list of the many, many devices in or with which the disclosed embodiments may be used.

Although not limited in this respect, the term "integrated circuit" (IC), as used herein refers to any suitable microcircuit, microchip, hybrid integrated circuit, digital integrated circuit and/or any other suitable electronic circuit, which includes, for example, a plurality of electronic devices manufactured in the surface of a thin substrate.

Although not limited in this respect, the term "system on chip" (SoC), as used herein refers to a single IC including a plurality of modules and/or components of a system. The SoC includes digital, analog, mixed-signal, radio-frequency (RF) and/or any other suitable functions. In one embodiment, the SoC may include one or more controllers, processors, microcontrollers, microprocessors, Digital-Signal-Processing (DSP) cores; one or more memories; one or more timing sources, e.g., oscillators and/or phase locked loops; one or more peripherals, e.g., counter-timers or power-on reset generators; one or more external interfaces, e.g., a Universal Serial Bus (USB), an Ethernet interface, Universal Asynchronous Receiver-Transmitter (UART), a Serial Peripheral Interface (SPI), and the like; one or more digital interfaces; one or more analog interfaces; and/or any other suitable modules. For example, a device, e.g., a cable modulator-demodulator (modem) or a cable gateway, may include a SoC capable of processing downstream and/or upstream digital samples corresponding to downstream and/or upstream RF channels of a cable communication system.

Figure 1:
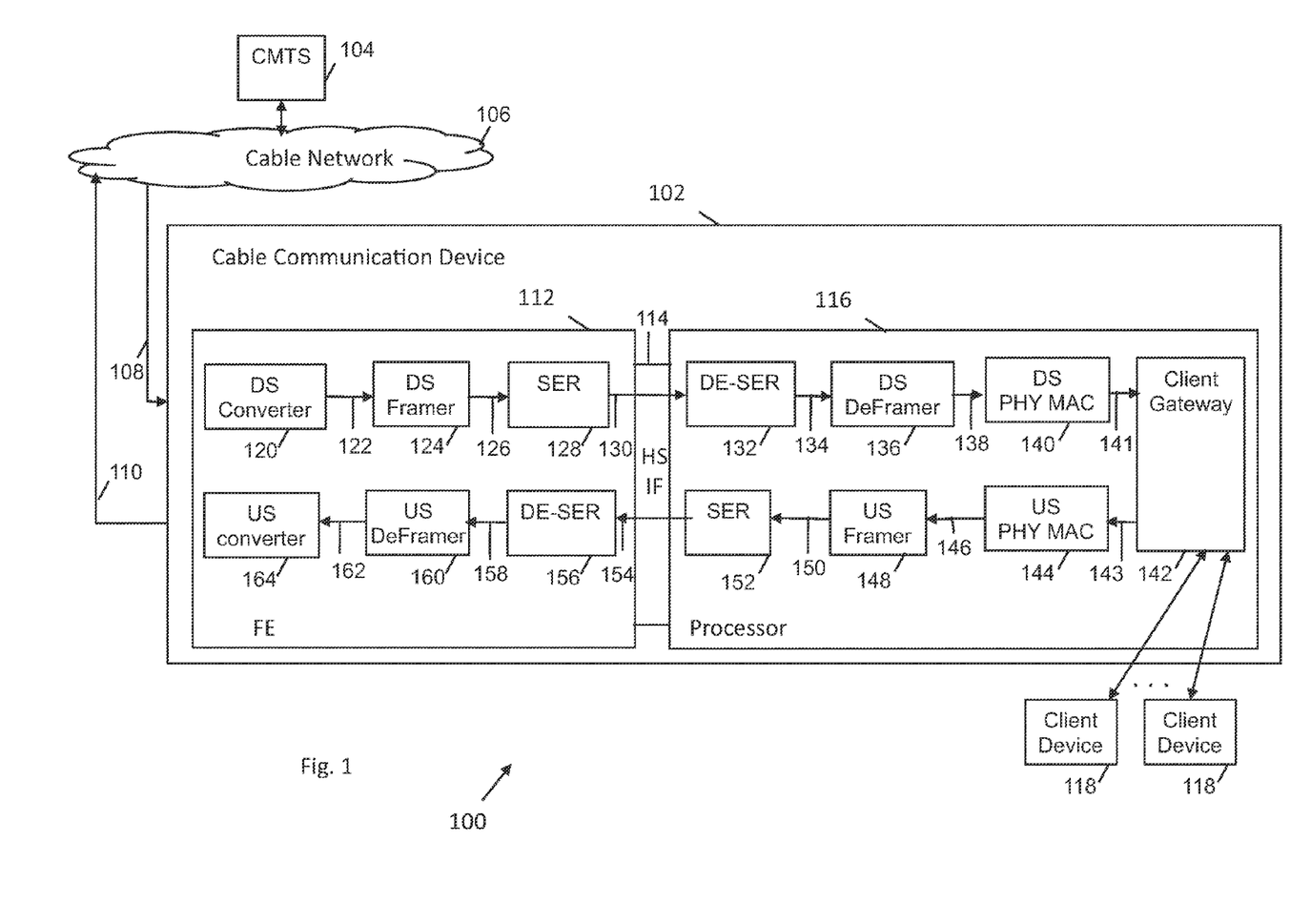
FIG. 1 is a schematic block diagram illustration of a cable communication system in accordance with some demonstrative embodiments.

Reference is no made to FIG. 1, which schematically illustrates a cable communication system 100, in accordance with some demonstrative embodiments.

In some demonstrative embodiments, system 100 may include a cable communication device 102 to transfer downstream (DS) data signals 108 from a Cable-Modem-Termination-System (CMTS) 104 to one or more devices (also referred to as "subscriber devices", or "client devices") 118, and to transfer upstream (US) data signals 110 from subscriber devices 118 to CMTS 104.

In some demonstrative embodiments, cable communication device 102 may include, or may be part of a cable modem, a cable gateway, and the like.

In some demonstrative embodiments, device 102 may communicate with CMTS 104 via a cable network 106.

In some demonstrative embodiments, system 100 may include a Cable Television (CATV) communication system capable of communicating data between CMTS 104 and client devices 118 via RF signals transmitted through network 106. Network 106 may include, for example, a network of coaxial cables and, optionally, optical fibers, e.g., if network 106 includes a Hybrid Fiber Coaxial (HFC) infrastructure. The data communicated between CMTS 104 and client devices 118 may include, for example, television data, video data, audio data, Internet data, telephony data, and the like.

In some demonstrative embodiments, one or more elements of system 100 may be configured to communicate in accordance with the Data Over Cable Service Interface Specification (DOCSIS), e.g., DOCSIS 3.0, and/or any other cable communication standard and/or specification.

In some demonstrative embodiments, client devices 118 may include, fir example, at least one of a television device capable of receiving television data from CMTS 104 via device 102, a telephone device cable of exchanging telephone signals with CMTS 104 via device 102, a video device capable of receiving video data from CMTS 104 via device 102, an audio device capable of receiving audio data from CMTS 104 via device 102, an internet-protocol (IP) device capable of exchanging IP signals with CMTS 104 via device 102, a storage device capable of storing and/or processing data received from CMTS 104 via device 102, a Wireless Local Area Network (WLAN) device capable of communicating data to/from CMTS 104 via a WLAN, and the like.

In some demonstrative embodiments, device 102 may include a Front End (FE) 112 connected to a processor 116 via an interface 114, e.g., as described in detail below.

In some demonstrative embodiments, interface 114 may include a serial interface configured to serially transfer DS and/or US information between FE 112 and processor 116, e.g., as described in detail below. Interface 114 may include, for example, one or more serial lanes, e.g., as described below. For example, interface 114 may include a high speed serial interface, for example, a Serial Advanced Technology Attachment (SATA) interface, e.g., an interface in accordance with the *SATA Revision* 3.0 *electrical specification, May* 2009, a Peripheral Component Interconnect (PCI), e.g., an interface in accordance with the *PCI express version* 3.0 *electrical specification*, and the like.

In some demonstrative embodiments, DS signals 108 and US signals 110 may include analog signals configured to be transferred over cable network 106.

For example, FE 112 may be configured to receive from cable network 106 the DS data signals 108 in the form of an analog input including a plurality of downstream data channels. In one non-limiting example, FE 112 may be configured to receive DS data signals 108 in the form of an analog RF signal modulated over an RE DS frequency band, e.g., an RF frequency band of 54-1002 Megahertz (MHz), or any other RF frequency band. In one non-limiting example, DS data signals 108 may include at least sixteen DS channels, e.g., at least 32 DS channels. In other embodiments, DS data signals 108 may be modulated over any other RF band and/or may include any other number of DS channels.

For example, FE 112 may be configured to transfer the US data signals 110 over cable network 106 in the form of an analog output including an upstream data channel. In one non-limiting example, FE 112 may be configured to provide US data signals 110 in the form of an analog RF signal modulated over an RF US frequency band, e.g., an RE frequency band of 5-85 MHz, or any other RF frequency band, in other embodiments, US data signals 110 may be modulated over any other RF band and/or may include two or more US channels.

In some demonstrative embodiments, FE 112 may be configured to convert DS data signals 108 into digital DS data signals. The DS data signals 108 may have a relatively wide bandwidth, for example, a bandwidth of about 1 Gigahertz (GHz), e.g., if DS data signals 108 are modulated over the RE frequency band of 54-1002 MHz.

In some demonstrative embodiments, processor 116 may be configured to receive the digital DS signals from FE 112 via interface 114, and to demodulate and process the DS signals, e.g., digitally.

In some demonstrative embodiments, processor 116 may include, or may be implemented as part of, a SoC. For example, processor 116 may include a SoC capable of processing downstream and/or upstream digital samples corresponding to downstream and/or upstream RF channels of system 100, e.g., in accordance with the DOCSIS and/or any other standard.

In some demonstrative embodiments, FE 112 may transfer the DS digital signals to processor 116 via a stream of DS data frames, which may be configured according to a predefined data link protocol, e.g., as described in details below.

In some demonstrative embodiments, the data link protocol may include a high-speed protocol, which may be configured to enable transferring digital samples corresponding to DS signals 108 over a low pin count and/or in a power efficient and/or reliable manner.

In some demonstrative embodiments, the data link protocol may support transmission of a plurality, e.g., a large number, of cable downstream channels, for example, at least eight cable downstream channels, e.g., at least sixteen cable downstream channels, e.g., 32 cable downstream channels or more.

In some demonstrative embodiments, the data link protocol may be configured to support the transfer of a digitized upstream signal from processor 116 to FE 102 via interface 114, e.g., as described in detail below. For example, the digitized upstream signal may include US data received from client devices 118.

In some demonstrative embodiments, FE 112 may be configured to receive DS data signals 108 in the form of an analog downstream input including a plurality of downstream data channels. FE 112 may be configured to provide a digital serial downstream output 130 including at least one continuous stream of constant-size downstream frames. The downstream frames may include a plurality of constant-size downstream data frames. A downstream data frame of the downstream data frames may include, for example, a downstream payload field, which includes downstream sample data of one or more downstream samples corresponding to each channel of two or more downstream channels of DS input signals 108. For example, the payload field of the frame may include downstream sample data of one or more downstream samples corresponding to each channel of a set of channels including a predefined number of the plurality of downstream data channels, e.g., as described in detail below.

In some demonstrative embodiments, processor 116 may be configured to receive digital serial downstream output 130 over serial interface 114, to process the downstream data frames, and to output, e.g., to client devices 118, a downstream output based on the downstream samples of the downstream data channels, e.g., as described in detail below.

In some demonstrative embodiments, the digital serial downstream output of FE 112 may include a plurality of serial streams transferred over a respective plurality of serial lanes of serial interface 114. According to these embodiments, a stream of the serial streams may include downstream data of a predefined number of channels of the plurality of downstream data channels.

In one example, the stream may include downstream data of sixteen channels of the plurality of downstream data channels, and the payload field may include downstream sample data of two or more downstream samples corresponding to each channel of the sixteen channels, e.g., as described below with respect to Table 2.

In another example, the stream may include downstream data of eight channels of the plurality of downstream data channels, and the payload field may include downstream sample data of four or more downstream samples corresponding to each channel of the eight channels, e.g., as described below with reference to Table 4.

In some demonstrative embodiments, the downstream sample data may include an inphase (I) component and a quadrature (Q) component of each of the one or more downstream samples, e.g., as described in detail below.

In some demonstrative embodiments, the downstream payload field may include downstream sample data of two or more downstream samples. In one example, the payload field may include two or more portions corresponding to the two or more downstream samples, respectively. For example, a particular portion corresponding to a particular downstream sample may include downstream sample data of the particular sample corresponding to each of the two or more channels. For example, the downstream sample data may be arranged within the particular portion according to an order of the two or more channels, e.g., as described below.

In some demonstrative embodiments, the stream of downstream frames may also include one or more status frames, e.g., frames, which do not include the downstream sample data. The status frames may be transmitted by FE 112, for example, as "filler" frames, e.g., in order to maintain a continuous flow of frames over interface 114, as described below.

In some demonstrative embodiments, FE 112 may include a DS converter 120 to convert analog DS data signals 108 into a plurality of digital samples 122. For example, digital samples 122 may include digital samples of the plurality of DS channels of DS data signals 108. Digital samples 122 may include, for example, an "I" component and a component for each sample. Each of digital samples 122 may be represented, for example, by a predefined number of bits, e.g., 12 bits.

In one non-limiting example, DS data signals 108 may include DS data of at least 16 channels. According to this example, digital samples 122 may be arranged in a plurality of streams of bits, e.g., including at least 16 groups of bit streams. Each group of bit streams may correspond to a particular channel of the 16 channels. Each group of bit streams may include, for example, a stream of bits representing a stream of samples corresponding to the particular channel. For example, each group of bit streams may include 12 streams of bits representing the "I" component of the samples and 12 streams of bits representing the "Q" component of the samples. According to this example, digital samples 122 may be arranged in 16*12*2=384 streams of bits. In other embodiments, digital bits 122 may be arranged in any other suitable number of groups and/or streams.

Figure 2:
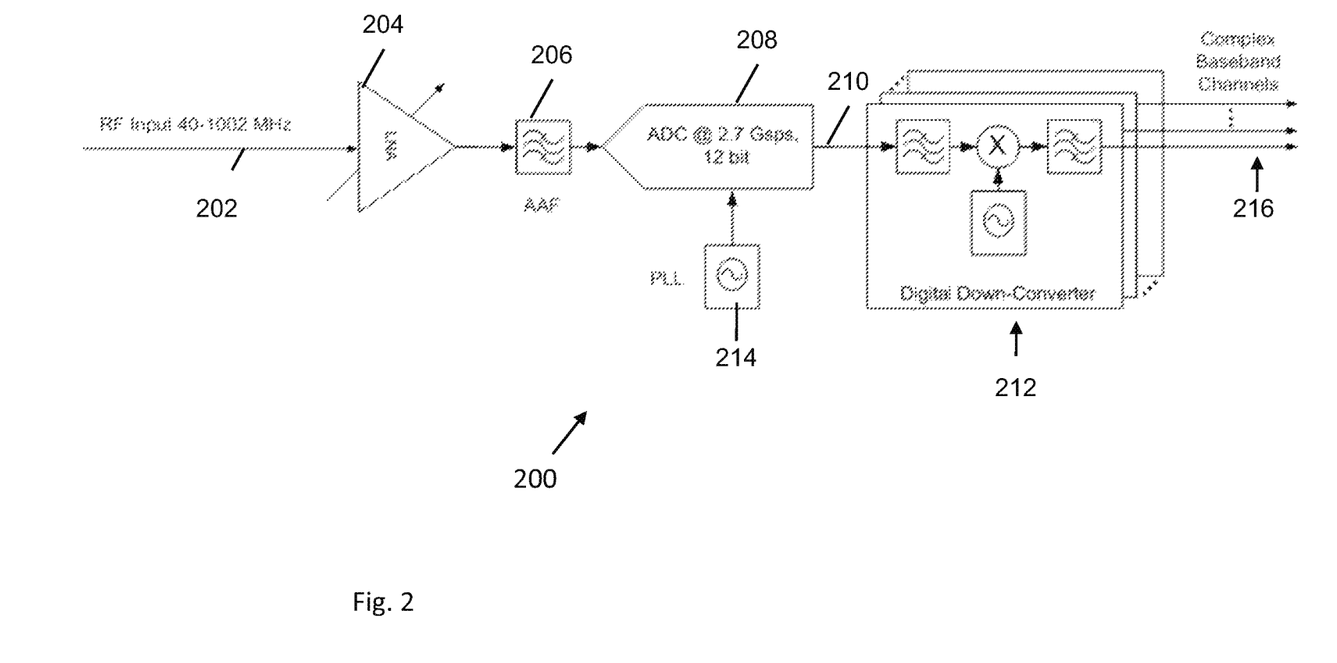
FIG. 2 is a schematic illustration of a downstream converter, in accordance with some demonstrative embodiments.

Reference is made to FIG. 2, which schematically illustrates a DS converter 200, in accordance with some demonstrative embodiments. For example, DS converter 200 may perform the functionality of DS converter 120 (FIG. 1).

In some demonstrative embodiments, converter 200 may be configured to convert an analog input signal 202, e.g., including DS data signals 108 (FIG. 1), into a plurality of digital samples 216, e.g., including digital samples 122 (FIG. 1).

In some demonstrative embodiments, converter 200 may include an analog low-noise amplifier (LNA) 204 to amplify input signal 202, an analog anti-aliasing-filter (AAF) 206 to filter an output of LNA 204, and an analog-to-digital converter (ADC) to convert analog input signal 202 into a digital signal 210 including a plurality of digital samples. For example ADC 208 may convert analog input signal 202 into samples of a predefined bit-size, at a predefined sampling rate. In one example, ADC 208 may convert analog input signal 202 into 12-bit samples at a sampling rate of 2.7 Giga samples per second (GSPS). ADC 208 may be controlled, for example, by a phase-lock-loop (PLL) 214.

In some demonstrative embodiments, converter 200 may also include a plurality of digital down-converters (DDCs) 212 to down-convert samples 210 into complex baseband signals 216 corresponding to the plurality of DS channels. For example, if input signal 202 includes data of 16 DS channels, converter 200 may include 16 DDCs 212 to convert samples 210 into 16 groups of bit streams corresponding to the 16 DS channels. For example, each group of bit streams may include 12 streams of bits representing the "I" component of the samples and 12 streams of bits representing the "Q" component of the samples, e.g., as described above.

Referring back to FIG. 1, in some demonstrative embodiments, FE 112 may include a DS framer 124 configured to arrange the plurality of digital samples 122 in a plurality of frames 126 to be transferred over interface 114, as a stream, to processor 116, e.g., as described in detail below.

In some demonstrative embodiments, framer 124 may support two framing modes corresponding to two respective baud rates, e.g., as described in detail below. In other embodiments, framer 124 may support only one of the framing modes and/or any other framing mode. For example, framer 124 may support a Full Mode (FM) corresponding to a predefined baud rate, and a Half Mode (UM), having a baud rate of half the baud rate of the FM. The HM may enable, for example, a back-up option, e.g., for reduced rate data transfer in case, for example, it is not possible to reach the FM rate with a sufficient bit error rate (BER). Alternatively, additional robustness may be achieved in case the data transfer requirement is satisfied by the HM.

In some demonstrative embodiments, framer 124 may support any specific information rate and/or serial rate, for example, such that the serial rate is equal to or higher than the information rate, e.g., inclusive of a framing redundancy.

In some demonstrative embodiments, interface 114 may include one or more DS serial lanes to transfer frames 126 generated by framer 124.

In some demonstrative embodiments, frames 126 generated by framer 124 may have a constant, predefined, frame size, e.g., as described below.

In some demonstrative embodiments, framer 124 and/or interface 114 may be configured to support various serial link rates, various numbers of DS channels, various sampling rates of FE 112, and/or any other parameters, while maintaining the constant frame size. For example, one or more of the number of channels transferred per DS lane of interface 114, and/or the number of DS lanes in interface 114 may be configured according to the serial link rate, number of DS channels, sampling rate of FE 112, e.g., the sampling rate of DDCs 212 (FIG. 2), and/or any other parameters.

In some demonstrative embodiments, the number of channels to be transferred per DS lane of interface 114 may be determined, for example, based on a specific channel sampling rate utilized by FE 112, and a link rate of interface 114, for example, such that the total information rate of data frames 126 generated by framer 124, may be equal to or lesser than the link rate of interface 114.

In some demonstrative embodiments, the number of DS lanes of interface 114 may be configured, for example, based on the number of DS channels included in input signals 108, and the number of channels to be used per DS lane.

In some demonstrative embodiments, the number of channels transmitted per DS lane for the HM framing mode may be half the number of channels transmitted per DS lane for the FM framing mode.

In some demonstrative embodiments, there may be no temporal dependency between the downstream lanes of interface 114, for example, if DS input 108 includes DOCSIS downstream channels, e.g., since DOCSIS downstream channels may not be correlated.

In some demonstrative embodiments, framer 124 may arrange digital samples 122 in at least one continuous stream of constant-size downstream frames 126 including a plurality of constant-size downstream data frames, and, optionally, a plurality of status frames. Framer 124 may generate each downstream data frame to include a downstream payload field. The payload field may include, for example, downstream sample data of one or more downstream samples corresponding to each of the particular number of downstream data channels of DS data 108.

In one non-limiting example, each serial lane of interface 114 may transfer 16 channels, and framer 124 may generate a continuous stream of downstream frames 126 including a plurality of constant-size downstream data frames, each including one or more pairs of samples, e.g., two pairs of I-Q samples, corresponding to each of the 16 channels, e.g., as described in detail below.

In another non-limiting example, each serial lane of interface 114 may transfer 8 channels, and framer 124 may generate a continuous stream of downstream frames 126 including a plurality of constant-size downstream data frames, each including one or more pairs of samples, e.g., four pairs of I-Q samples, corresponding to each of the 8 channels, e.g., as described in detail below.

In other embodiments, frames 126 may include data frames including any other number and/or arrangement of digital data samples.

In some demonstrative embodiments, framer 124 may generate a continuous stream of frames 126 to be continuously transmitted over interface 114, e.g., as described in detail below.

In some demonstrative embodiments, framer 124 may generate frames 126 including downstream data frames and downstream status frames. A data frame may include a data payload field carrying data of digital samples 122, e.g., as described below. A status frame may not include data of digital samples 122. Instead, the status frame may be utilized to deliver any predefined status information to processor 116, and/or to serve as a "filler" frame to maintain the continuous transmission of frames 126 over interface 114. For example, framer 124 may insert status Barnes into the stream of frames 126, e.g., asynchronously, for example, in order to match the data rate of digital samples 122 to the serial rate of interface 114. For example, framer 124 may insert a status frame into frames 126 when there is no available data frame ready for transmission. The use of the status frames as fillers may allow adjusting an actual data rate of digital samples 122 to a required serial rate of interface 114, e.g., provided that the serial rate is equal to or higher than the data rate including data frame redundancy.

In some demonstrative embodiments, a frame of frames 126 may include a synchronization (Sync) field, for example, a 10-bit Sync word, e.g., a K.28 Coma Sync word, followed by a payload field. Different Sync words may be used, e.g., to distinguish between data and status frames. For example, a first Sync word, e.g., a K28.5 Sync word, may be included in a data frame, and a second, different, Sync word, e.g., a K28.1 Sync word, may be included in a status frame.

In some demonstrative embodiments, the payload field may be encoded with a 10/8 bit encoding, or any other encoding. For example, if the 10/8 bit encoding is used, a total bit-length of a frame of frames 126 may be a multiple of 10 (8 before encoding).

In some demonstrative embodiments, framer 124 may output frames 126 such that a Least-Significant-Bit (LSB) is output first, and a Most-Significant-Bit (MSB) is output last. The LSB bit may be denoted "0".

In some demonstrative embodiments, the frame may also include a header field including one or more parameters relating to the frame. For example, the header field may include a value indicating whether the frame is a status frame or a data frame, a value indicating a validity of the frame, and the like.

In some demonstrative embodiments, the frame may also include an error detection and/or error correction field, e.g., a check field ("parity field") including a check value to verify integrity of at least the payload field and, optionally, the header field. For example the check field may include a cyclic redundancy check (CRC) value, a Reed-Solomon (RS) forward-error-correction (FEC) value, and the like.

In one non-limiting example, the check field may include a CRC value, which may be generated, for example, according to a generator polynomial, for example, a CRC-16 Generator polynomial, e.g., the $x^{16}+x^{15}+x^2+1$ generator polynomial as defined by American National Standards Institute (ANSI).

In another non-limiting example, the RS code may include a RS code defined over the Galois field (GF) of $GF[2^8]$, e.g., using the polynomial $x^8+x^4+x^3+x^2+1$.

In some demonstrative embodiments, a frame of frames 126 may have the following frame structure:

TABLE 1

| 8-bit words | Name | Content | Description |
|---|---|---|---|
| 1 | Sync | Sync placeholder. To be converted to 10 bit K28.5 or K28.1 symbol | Comma symbol is the first data in the stream, K28.5 is for Data Frame. K28.1 is for Status Frame |
| 1 | Header | Packet Information such as Data/Status, Valid/Invalid, Reserved. | Bits 7, 6 indicate that this frame is Data Frame (11) or Status Frame (00). Bit 5 is Validity bit. Bit 5 = 1 is for a Valid packet. Bit 5 = 0 is for Invalid packet. |
|  | Payload | Payload | Data Payload |
| 2 | Parity | CRC16 or RS | Either CRC or RS encoding covering the data bytes from Header byte to the end of the payload. |

In some demonstrative embodiments, the payload field of the frame may include digital data samples corresponding to a particular plurality of DS channel of DS data signals 108.

In one non-limiting example, the payload field of the frame may include digital data samples corresponding to each of 16 DS channels, e.g., as described below.

According to this example, the payload field of the data frame may include the complex baseband samples of the 16 DS channels for Full Mode, e.g., if 16 channels are transferred per lane of interface 114. The payload field of the data frame may include the complex baseband samples of 8 DS channels for Half Mode, e.g., if 8 channels are transferred per lane of interface 114. For example, each serial lane of interface 114 may be assigned a set of 16 particular channels of DS data 108, in the FM, or a set of 8 particular channels of DS data 108, in the HM. The payload may include a complex sample of samples 122 per channel, e.g., in the form of a pair of I and Q samples. Zeros are transmitted instead of samples, for example, if a certain channel is not active.

For example, a data frame of frames 126 may have the following frame structure, e.g., in Full Mode:

TABLE 2

| 8-bit words | Content | Description |
| --- | --- | --- |
| 1 | Sync | Data Frame Sync |
| 1 | Header | Data Frame Header |
| 48 | 16 I/Q pairs of samples of 16 tuner data channels | 12 bits per sample. I first, Q second, LSB first, MSB last. Channel 0 to channel 15 |
| 48 | Next 16 I/Q pairs of samples of 16 tuner data channels | 12 bits per sample. I first, Q second, LSB first, MSB last. Channel 0 to channel 15 |
| 2 | Parity | |

Figure 3:
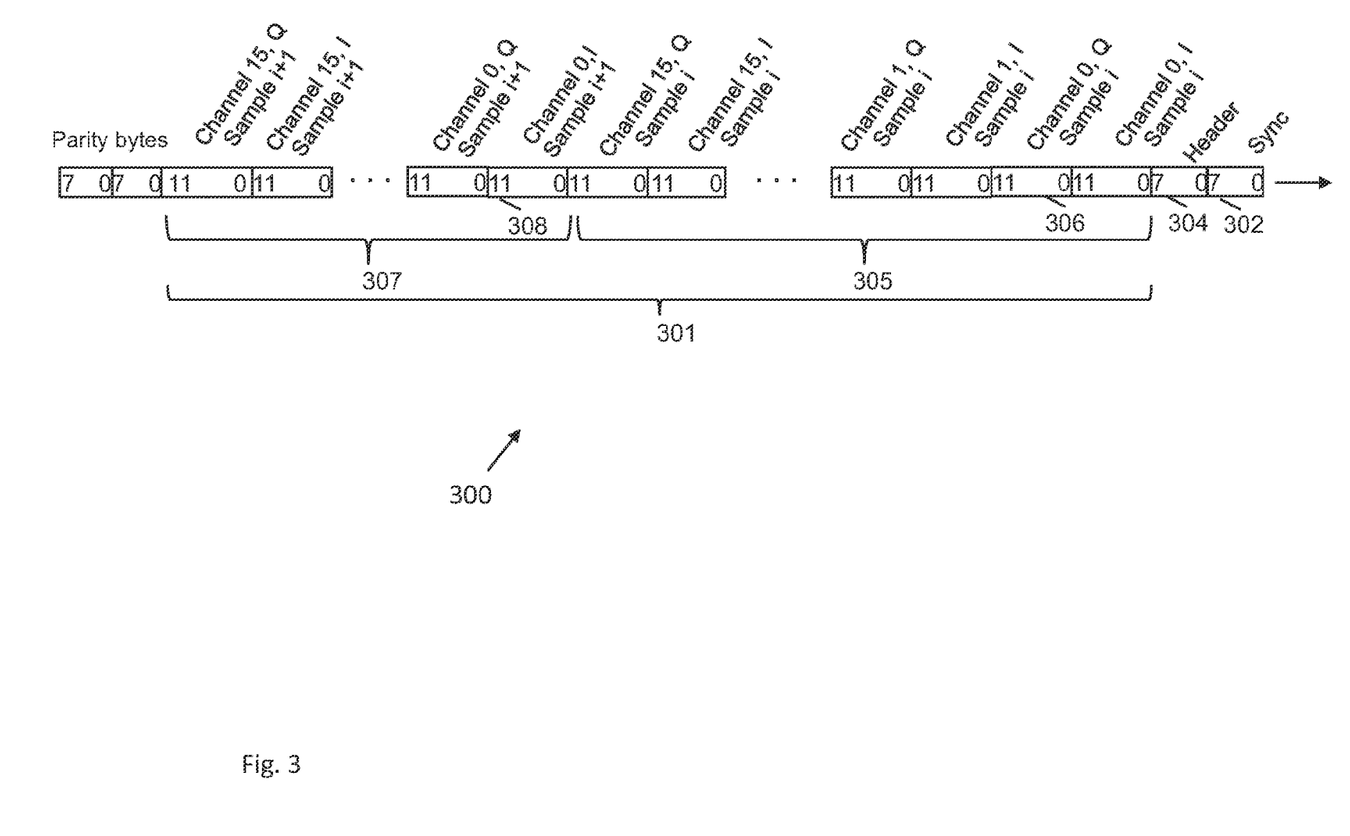
FIG. 3 is a schematic illustration of a data frame including two pairs of I-Q digital samples corresponding to each of 16 downstream channels, in accordance with some demonstrative embodiments.

The following table is a non-limiting example for a particular sample number, denoted i, given there are 16 channels per serial lane. Each 12 bit sample is fed LSB first, MSB last. Each 8 bit word (Sync, Header and Parity) is also fed LSB first, MSB last:

samples corresponding to the sample i+1, subsequent to the i-th sample, of each of 16 DS channels. As shown in FIG. 3, the samples of portions 305 and 307 may be ordered according to the order of the 16 DS channels, e.g., such that two consecutive samples of a channel are separated by samples of other channels. For example, the pair of I-Q samples of the sample i of channel "0" may be separated from the pair of I-Q samples of the sample i+1 of channel "0" by fifteen pairs of I-Q samples of the sample i of the channels 1-15. Such interleaving of the samples of each channel with samples of other channels may provide, for example, a scrambling of the samples between the channels. The interleaving may result, for example, in an improved level of error detection and/or correction with respect to a particular channel, e.g., since an error may be distributed across the channels.

In another non-limiting example the payload field of the frame may include digital data samples corresponding to each of 8 DS channels, e.g., as described below.

According to this example, the payload field of the data frame may include the complex baseband samples of 8 DS channels for Half Mode, e.g., if 8 channels are transferred per lane of interface 114. For example, the payload may include one or more pairs of samples, e.g., four pairs of I-Q samples, corresponding to each of the 8 channels. Zeros may be transmitted instead of samples, for example, if a certain channel is not active.

Referring back to FIG. 1., a data frame of frames 126 may have, for example, the following frame structure, e.g., in Half Mode:

TABLE 3

| Sync | Header | Chan 0, Isample i | Chan 0, Qsample i | Chan 1, Isample i | Chan 1, Qsample i | ... | Chan 15, Isample i | Chan 15, Qsample i | Chan 0, Isample i+1 | Chan 0, Qsample i+1 | Chan 1, Isample i+1 | Chan 1, Qsample i+1 | ... | Chan 15, Isample i+1 | Chan 15, Qsample i+1 | Parity | Parity |
| --- | --- | --- | --- | --- | --- | --- | --- | --- | --- | --- | --- | --- | --- | --- | --- | --- | --- |

FIG. 3 schematically illustrates a data frame 300 including two pairs of I-Q digital samples corresponding to each of 16 downstream channels, in accordance with some demonstrative embodiments. For example, a data frame of frames 126 (FIG. 1) may have the structure of frame 300.

As shown in FIG. 3, a Sync field 302 of frame 300, which may include an 8-bit Sync word, may be transmitted, followed by a header field 304, which may include an 8-bit header word.

A also shown in FIG. 3, header field 304 may be followed by a payload field 301 including sample data of the two consecutive samples, sample i and sample i+1, of the 16 downstream channels. As shown in FIG. 3 payload filed 301 may include a first portion 305 including downstream sample data of the sample i, followed by a second portion 307 including downstream sample data of the sample i+1.

Ins some demonstrative embodiments, the downstream sample data may be arranged within portions 305 and 307 according to an order of the channels.

For example, as shown in FIG. 3, portion 305 may include a first set of 16 pairs of twelve-bit payload words 306 representing 16 pairs of I-Q samples corresponding to the i-th sample of each of 16 DS channels. Portion 305 may be followed by portion 307 including a second set of 16 pairs of twelve-bit payload words 308 representing 16 pairs of I-Q

TABLE 4

| 8-bit words | Content | Description |
| --- | --- | --- |
| 1 | Sync | Data Frame Sync |
| 1 | Header | Data Frame Header |
| 24 | 8 I/Q pairs of samples of 8 for tuner data channels | 12 bits per sample. I first, Q second, LSB first, MSB last. Channel 0 to channel 7 |
| 24 | Next 8 I/Q pairs of samples of 8 tuner data channels | 12 bits per sample, I first, Q second, LSB first, MSB last. Channel 0 to channel 7 |
| 24 | Next 8 I/Q pairs of samples of 8 tuner data channels | 12 bits per sample. I first, Q second, LSB first, MSB last. Channel 0 to channel 7 |
| 24 | Next 8 I/Q pairs of samples of 8 tuner data channels | 12 bits per sample. I first, Q second, LSB first, MSB last. Channel 0 to channel 7 |
| 2 | Parity | |

In some demonstrative embodiments, a status frame of frames 126 may have a predefined size, e.g., 10 bytes. The status frame may include a Sync word and/or a header word, e.g., as described above. The status frame may include one or more additional fields, which may have either a zero value or another, e.g., predefined, value indicating one or more predefined status parameters.

For example, a status frame of frames 126 may have the following frame structure:

TABLE 5

| Bytes | Name | Description |
|---|---|---|
| 1 | Sync | Status Frame Sync |
| 1 | Header | Status Frame Header |
| 4 | [Currently Unused, filled with zeros] | |
| 4 | [Currently Unused, filled with zeros] | |
| 2 | [Currently Unused, filled with zeros] | |

In some demonstrative embodiments, framer 124 may generate the stream of DS frames 126 in the form of a plurality of parallel bit streams, e.g., according to a rate supported by framer 124. For example, framer 124 may generate frames 126 in the form of 20 parallel bit streams, or any other number of parallel bit streams.

According to these embodiments, FE 112 may include a serializer (SER) 128 configured to generate output 130 in the form of at least one serial stream of bits including frames 126 in accordance with a configuration of interface 114, e.g., the number of lanes in interface 114 and/or the data rate of the lanes.

In some demonstrative embodiments, processor 116 may be configured to receive output 130 over interface 114, to extract digital samples 122 from frames 126, to demodulate and process the digital samples, and to provide an output to client devices 118, e.g., as described in detail below.

In some demonstrative embodiments, processor 116 may include a deserializer (DESER) 132 to convert the stream of bits of output 130 into a plurality of parallel bit streams 134 including frames 126.

In some demonstrative embodiments, processor 116 may include a DS deframer 136 to extract from frames 126 a plurality of digital samples 138. For example, deframer 136 may extract digital samples 122 from frames 126, e.g., in accordance with the data link protocol described above.

In some demonstrative embodiments, deframer 136 may achieve frame synchronization with framer 124, e.g., when the K28 comma symbols of frames 126 are found in a predefined nominal position a predefined number of times, denoted S1, sequentially. The nominal position may depend on the mix of the data and status frames in the stream of frames 126. Deframer 136 may consider the frame synchronization to be lost, for example, when the frame synchronization symbol is not detected a predefined number, denoted S2, of times within a predefined number, denoted S3, of consecutive frames in the stream of frames 126. The numbers S1, S2 and/or S3 may be programmable.

In some demonstrative embodiments, a detected error in the sync word may not cause sync loss or packet loss by deframer 136.

In some demonstrative embodiments, deframer 136 may utilize one or more error counters to measure a Frame Error Rate (FER) of the stream of frames 126, e.g., based on detected errors in the check fields of the received frames.

In some demonstrative embodiments, processor 116 may include one or more physical layer (PHY) and/or media-access-control (MAC) layer modules 140 to process digital samples 138, and to generate a plurality of digital signals 141 corresponding to the plurality of DS channels of DS input 108. For example, modules 140 may include MAC and/or PHY modules in accordance with the DOCSIS and/or any other standard.

In some demonstrative embodiments, processor 116 may also include a client gateway 142 configured to distribute signals 141 to client devices 118.

In some demonstrative embodiments, processor 116 may be configured to receive an upstream input including upstream data samples corresponding to an upstream data channel. For example, processor 116 may receive the upstream input from one or more client devices 118. The upstream input may include, for example, data to be transferred from one or more of client devices 118 to CMTS 104. For example, the upstream input may include an input signal including all DOCSIS US channels modulated on a plurality of RF frequencies within an US frequency band, e.g., the frequency band of 5-85 MHz. The upstream data samples may include for example, "real" data samples, e.g., samples in a real-number representation.

In some demonstrative embodiments, processor 116 may be configured to transfer the upstream data samples to FE 112 via interface 114, e.g., as described in detail below.

In some demonstrative embodiments, processor 116 may generate a digital serial upstream output including a continuous stream of constant-sized upstream frames, e.g., as described in detail below.

In some demonstrative embodiments, the upstream frames may include a plurality of upstream data frames. For example, an upstream data frame of the upstream data frames may include an upstream payload field, which includes upstream sample data of the upstream samples, e.g., as described below.

In some demonstrative embodiments, interface 114 may include one or more serial lanes to transfer the upstream frames from processor 116 to FE 112. Processor 116 may transfer the upstream frames in HM or in FM. For example, the FM may utilize a first number of serial lanes of interface 114, and the HM may utilize a second number of serial lanes of interface 114. For example, the second number of lanes may be greater than the first number of lanes, e.g., the second number of lanes may be double the first number of lanes.

In one non-limiting example, interface 114 may include two upstream serial lanes. For example, both of the upstream lanes may be utilized for HM, while only one of the serial lanes may be utilized for FM. For example, in HM, a first portion of US samples, e.g., the odd samples, may be transmitted on a first serial lane, and a second portion of the US samples, e.g., the even samples, may be transmitted on a second serial lane of interface 114. FE 112 and/or processor 116 may have a programmable option to configure and/or coordinate which US lane of interface 114 is assigned for the odd samples and which SU lane of interface 114 is assigned for the even samples.

In some demonstrative embodiments, client gateway 142 may generate a plurality of upstream data samples 143 based on upstream input signals received from client devices 118.

In some demonstrative embodiments, processor 116 may receive the upstream samples at a predefined data rate, e.g., a data rate of 270 Mega Samples Per Second (MSPS), or any other data rate. The upstream samples may have a predefined size, e.g., a size of 15 bits, or any other size.

In some demonstrative embodiments, processor 116 may include one or more physical layer (PHY) and/or media-access-control (MAC) layer modules 144 to process upstream samples 143, and to generate an upstream digital signal 146 including upstream samples 143, to be provided to FE 112. For example, modules 144 may include MAC and/or PRY modules in accordance with the DOCSIS and/or any other standard.

In some demonstrative embodiments, processor 116 may generate a digital serial upstream output including a continuous stream of constant-sized upstream frames including a plurality of upstream data frames to be transmitted to FE 112 via interface 114. For example, an upstream data frame of the upstream data frames may include an upstream payload field, which includes upstream sample data of upstream samples 143, e.g., as described below.

In other demonstrative embodiments, processor 116 may include a digital-to-analog converter (DAC) to convert upstream digital signal 146 into an analog signal, which may be transferred via FE 112 to cable network 106.

In some demonstrative embodiments, processor 116 may include an upstream framer 148 to arrange upstream samples 143 in a plurality of upstream frames 150 to be transferred over interface 114, as a stream, to Fe 112, e.g., as described in detail below.

In some demonstrative embodiments, framer 148 may support two framing modes corresponding to two respective baud rates, e.g., as described in detail below. In other embodiments, framer 148 may support only one of the framing modes and/or any other framing mode. For example, framer 148 may support the FM and the HM.

In some demonstrative embodiments, framer 148 may support any specific information rate and/or serial rate, for example, such that the serial rate is equal to or higher than the information rate, e.g., inclusive of a framing redundancy.

In some demonstrative embodiments, frames 150 generated by framer 148 may have a constant, predefined, frame size, e.g., as described below.

In some demonstrative embodiments, framer 148 may arrange upstream samples 143 in at least one continuous stream of constant-size upstream frames 150 including a plurality of constant-size upstream data frames, and, optionally, a plurality of status frames. Framer 148 may generate each upstream data frame to include an upstream payload field including a plurality of the upstream samples 143.

In some demonstrative embodiments, framer 148 may generate a continuous stream of frames 150 to be continuously transmitted over interface 114, e.g., as described in detail below.

In some demonstrative embodiments, framer 148 may generate frames 150 including upstream data frames and upstream status frames. A data frame may include a data payload field carrying data of upstream samples 143, e.g., as described below. A status frame may not include data of upstream samples 143. Instead, the status frame may be utilized to deliver any predefined status information to FE 112, and/or to serve as a "filler" frame to maintain the continuous transmission of frames 150 over interface 114. For example, framer 148 may insert status frames into the stream of frames 150, e.g., asynchronously, for example, in order to match the data rate of upstream samples 143 to the serial rate of interface 114. For example, framer 148 may insert a status frame into frames 150 when there is no available data frame ready for transmission. The use of the status frames as fillers may allow adjusting an actual data rate of upstream samples 143 to a required serial rate of interface 114, e.g., provided that the serial rate is equal to or higher than the data rate including data frame redundancy.

In some demonstrative embodiments, a frame of frames 150 may include a synchronization (Sync) field followed by a header field, e.g., as described above with reference to frames 126.

In some demonstrative embodiments, framer 148 may output frames 150 such that a LSB is output first, and a MSB is output last. The LSB bit may be denoted "0".

In some demonstrative embodiments, a data frame of frames 150 may also include a payload field, which may be encoded with a 10/8 bit encoding, or any other encoding.

In some demonstrative embodiments, the data frame may also include an error detection and/or error correction field, e.g., a check field including a check value to verify integrity of at least the payload field and, optionally, the header field. For example the check field may include a CRC value, a RS FEC value, and the like.

In some demonstrative embodiments, the payload field of the data frame may include a plurality of upstream samples 143, e.g., including a particular number of upstream samples.

In one example, the payload field of the data frame may include a predefined number of consecutive upstream samples, e.g., 64 consecutive upstream samples. For example, in the FM, framer 150 may generate the data frame including 64 consecutive 15-bit upstream samples. In the HM, framer 150 may generate the data frame including either 64 odd or 64 even consecutive 15-bit upstream samples.

For example, a data frame of frames 150 may have the following frame structure:

TABLE 6

| 8-bit words | Content | Description |
|---|---|---|
| 1 | Sync | Data Frame Sync |
| 1 | Header | Data Frame Header |
| 120 | Data samples | FM: 64 consecutive 15-bit samples |
| | | HM: 64 even or odd consecutive 15-bit samples |
| | | Each 15-bit sample is fed LSB first, MSB last |
| 2 | Parity | |

In some demonstrative embodiments, a status frame of frames 150 may a structure similar to the structure described above with respect to frames 126.

In some demonstrative embodiments, framer 148 may generate the stream of frames 150 in the form of a plurality of parallel bit streams, e.g., according to a rate supported by framer 148. According to these embodiments, processor 116 may include a SER 152 configured to generate an output 154 in the form of at least one serial stream of bits including frames 150 in accordance with a configuration of interface 114 e.g., the number of lanes in interface 114 and/or the data rate of the lanes.

In some demonstrative embodiments, FE 112 may be configured to receive output 154 over interface 114, to extract samples 143 from frames 150, to convert samples 143 into analog upstream data signals 110, e.g., as described in detail below.

In some demonstrative embodiments, FE 112 may include a DESER 156 to convert the stream of bits of output 154 into a plurality of parallel bit streams 158 including frames 150.

In some demonstrative embodiments, FE 112 may include an US deframer 160 to extract from frames 150 a plurality of digital samples 162. For example, deframer 160 may extract digital samples 162 from frames 150, e.g., in accordance with the data link protocol described above.

In some demonstrative embodiments, FE 112 may include an upstream converter 164 to process digital samples 162, and to generate analog upstream data signals 110. For example, converter 164 may include a DAC and/or one or more other modules.

Figure 4:
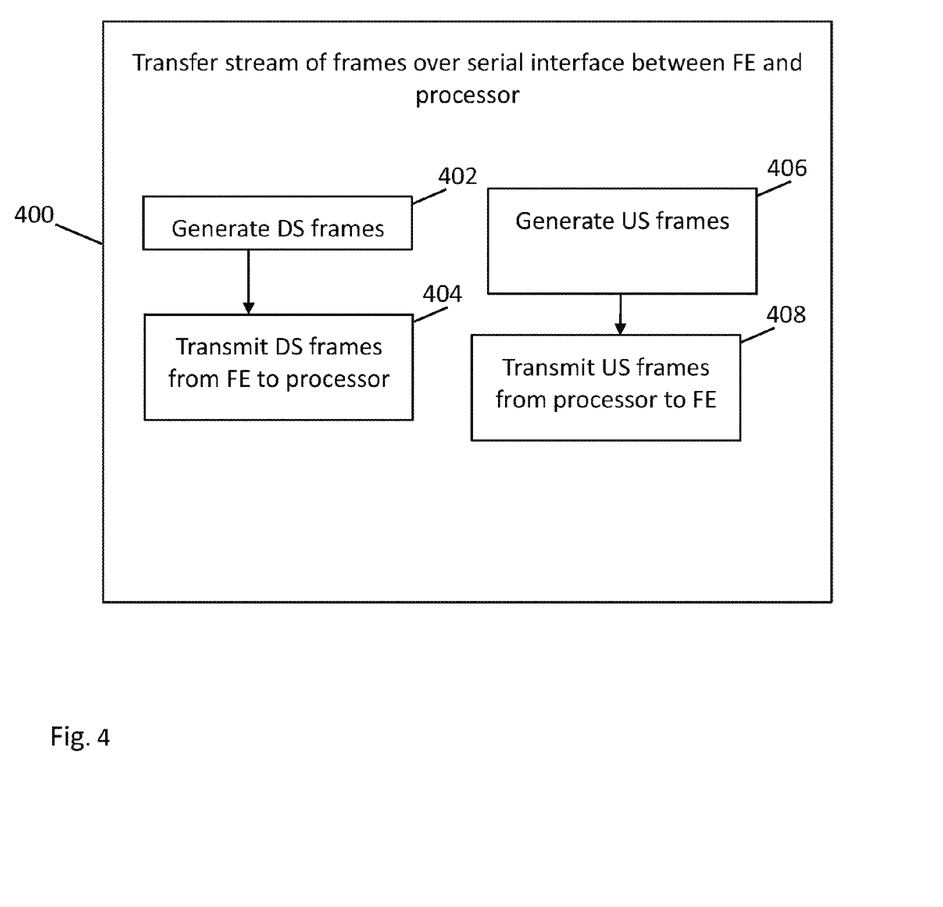
FIG. 4 is a schematic illustration of a method of transferring data between elements of a cable communication device, in accordance with some demonstrative embodiments.

Reference is now made to FIG. 4, which schematically illustrates a method of transferring data between elements of a cable communication device, in accordance with some demonstrative embodiments. One or more operations of the method of FIG. 4 may be performed, for example, by a system, e.g., system 100 (FIG. 1), a cable communication device, e.g., device 102 (FIG. 1), a FE, e.g., FE 112 (FIG. 1), and/or a processor, e.g., processor 116 (FIG. 1).

As indicated at block 400, the method may include transferring at least one stream of frames over a serial interface between a FE and a processor.

As indicated at block 402, the method may include generating a stream of DS frames. For example, framer 124 (FIG. 1) may generate frames 126 (FIG. 1), e.g., as described above.

As indicated at block 404, the method may include transmitting the DS frames over the serial interface from the FE to the processor. For example, FE 112 (FIG. 1) may transmit frames 126 (FIG. 1) to processor 116 (FIG. 1) over interface 114 (FIG. 1), e.g., as described above.

As indicated at block 406, the method may include generating a stream of US frames. For example, framer 148 (FIG. 1) may generate frames 150 (FIG. 1), e.g., as described above.

As indicated at block 404, the method may include transmitting the US frames over the serial interface from the processor to the FE. For example, processor 116 (FIG. 1) may transmit frames 150 (FIG. 1) to FE 112 (FIG. 1) over interface 114 (FIG. 1), e.g., as described above.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A device comprising:
a processor to receive over a serial interface a digital serial downstream input including at least one continuous stream of constant-size downstream frames, said downstream frames including a plurality of constant-size downstream data frames, each downstream data frame of the downstream data frames including a downstream payload field, which includes downstream sample data of one or more downstream samples corresponding to each channel of a plurality of downstream data channels, wherein said processor is to process said downstream data frames and to output a downstream output based on the downstream samples of said downstream data channels.

2. The device of claim 1, wherein said processor is to receive an upstream input including upstream samples corresponding to an upstream data channel, and to generate a digital serial upstream output including a continuous stream of constant-sized upstream frames, said upstream frames including a plurality of upstream data frames, each upstream data frame of the upstream data frames including an upstream payload field, which includes upstream sample data of said upstream samples.

3. The device of claim 1, wherein the downstream sample data comprises an inphase (I) component and a quadrature (Q) component of each of said one or more downstream samples.

4. The device of claim 1, wherein said one or more downstream samples comprise two or more downstream samples.

5. The device of claim 4, wherein said downstream payload field comprises two or more portions corresponding to said two or more downstream samples, respectively, each portion of said portions including downstream sample data of a respective downstream symbol ordered according to said downstream channels.

6. The device of claim 1, wherein said digital serial downstream input includes a plurality of streams transferred over a respective plurality of serial lanes, wherein a stream of said plurality of streams includes downstream data of a predefined number of channels of said plurality of downstream data channels, and wherein said payload field includes downstream sample data of one or more downstream samples corresponding to each channel of the predefined number of channels.

7. The device of claim 6, wherein the stream includes downstream data of sixteen channels of said plurality of downstream data channels, and wherein said payload field includes downstream sample data of two or more downstream samples corresponding to each channel of the sixteen channels.

8. The device of claim 6, wherein the stream includes downstream data of eight channels of said plurality of downstream data channels, and wherein said payload field includes downstream sample data of four or more downstream samples corresponding to each channel of the eight channels.

9. The device of claim 1, wherein said stream of downstream frames comprises one or more status frames, which do not include said downstream sample data.

10. The device of claim 1, wherein said processor comprises a system on chip (SoC).

11. A device comprising:
a front-end to receive an analog downstream input including a plurality of downstream data channels, and to provide a digital serial downstream output including at least one continuous stream of constant-size downstream frames to be transmitted on at least one respective serial lane, said downstream frames including a plurality of constant-size downstream data frames, each downstream data frame of the downstream data frames including a downstream payload field, which includes downstream sample data of one or more downstream samples corresponding to each of two or more channels of said plurality of downstream data channels.

12. The device of claim 11, wherein said front-end is to receive a digital serial upstream input including a continuous stream of constant-sized upstream frames, said upstream frames including a plurality of upstream data frames, each upstream data frame of the upstream data frames including an upstream payload field, which includes upstream sample data of one or more upstream samples corresponding to an upstream data channel, and to generate an analog upstream output including said upstream data channel.

13. The device of claim 11, wherein the downstream sample data comprises an inphase (I) component and a quadrature (Q) component of each of said one or more downstream samples.

14. The device of claim 11, wherein said one or more downstream samples comprise two or more downstream samples.

15. The device of claim 11, wherein said digital serial downstream output includes a plurality of streams transferred over a respective plurality of serial lanes, wherein a stream of said plurality of streams includes downstream data of a predefined number of channels of said plurality of downstream data channels, and wherein said payload field includes downstream sample data of one or more downstream samples corresponding to each channel of the predefined number of channels.

16. The device of claim 15, wherein the stream includes downstream data of sixteen channels of said plurality of downstream data channels, and wherein said payload field includes downstream sample data of two or more downstream samples corresponding to each channel of the sixteen channels.

17. The device of claim 15, wherein the stream includes downstream data of eight channels of said plurality of downstream data channels, and wherein said payload field includes downstream sample data of four or more downstream samples corresponding to each channel of the eight channels.

18. The device of claim 11, wherein said stream of downstream frames comprises one or more status frames, which do not include said downstream sample data.

19. A cable communication system comprising:
a cable communication device comprising:
    a front-end to receive an analog downstream input including a plurality of downstream data channels, and to provide a digital serial downstream output including at least one continuous stream of constant-size downstream frames including a plurality of constant-size downstream data frames, which include downstream sample data of said plurality of downstream data channels;
    a serial interface including at least one serial lane to transfer said at least on stream of said digital serial downstream output; and
    a processor to receive said digital serial downstream over said serial interface, to process said downstream data frames and to output a downstream output based on the downstream sample data of said downstream data channels.

20. The system of claim 19, wherein each downstream data frame of the downstream data frames includes a downstream payload field, which includes downstream sample data of one or more downstream samples corresponding each of two or more channels of said plurality of downstream data channels.

21. The system of claim 20, wherein the downstream sample data comprises an inphase (I) component and a quadrature (Q) component of each of said one or more downstream samples.

22. The system of claim 20, wherein said one or more downstream samples comprise two or more downstream samples.

23. The system of claim 20, wherein said serial interface comprises a plurality of serial lanes, said digital serial downstream output includes a plurality of streams transferred over said plurality of serial lanes, respectively, wherein a stream of said streams includes downstream data of a predefined number of channels of said plurality of downstream data channels, and wherein said payload field includes downstream sample data of one or more downstream samples corresponding to each channel of the predefined number of channels.

24. The system of claim 19, wherein said processor is to receive an upstream input including upstream samples corresponding to an upstream data channel, and to transfer to said front-end via said serial interface a digital serial upstream output including a continuous stream of constant-sized upstream frames, said upstream frames including a plurality of upstream data frames, each upstream data frame of the upstream data frames including an upstream payload field, which includes upstream sample data of said upstream samples.

25. The system of claim 19, wherein said cable communication device comprises a cable gateway.

26. A method comprising:
transferring over a serial interface between a front-end and a processor at least one continuous stream of constant-size downstream frames, said downstream frames including a plurality of constant-size downstream data frames, each downstream data frame of the downstream data frames including a downstream payload field, which includes downstream sample data of one or more downstream samples corresponding to each channel of a plurality of downstream data channels.

27. The method of claim 26 comprising:
transferring over said serial interface a continuous stream of constant-sized upstream frames, said upstream frames including a plurality of upstream data frames, each upstream data frame of the upstream data frames including an upstream payload field, which includes upstream sample data of an upstream data channel.

28. The method of claim 26, wherein the downstream sample data comprises an inphase (I) component and a quadrature (Q) component of each of said one or more downstream samples.

29. The method of claim 26, wherein said one or more downstream samples comprise two or more downstream samples.

* * * * *